United States Patent [19]

Ross, Jr.

[11] 4,090,594
[45] May 23, 1978

[54] TROLLEY RAIL

[76] Inventor: Donald R. Ross, Jr., 435 Clokey Ave., Pittsburgh, Pa. 15228

[21] Appl. No.: 830,672

[22] Filed: Sep. 6, 1977

[51] Int. Cl.² .............................................. B60M 1/34
[52] U.S. Cl. .................................. 191/23 A; 191/44.1; 339/22 T
[58] Field of Search ................ 191/23 R, 23 A, 29 R, 191/33 R, 44.1; 339/22 T; 174/75 R, 75 F, 75 C, 88 R, 88 B

[56] References Cited

U.S. PATENT DOCUMENTS

| 2,835,752 | 5/1958 | Anjeskey | 191/44.1 |
| 2,958,743 | 11/1960 | Moore | 191/23 A |
| 3,772,482 | 11/1973 | Ross | 191/23 R |

Primary Examiner—Trygve M. Blix
Assistant Examiner—Reinhard J. Eisenzopf
Attorney, Agent, or Firm—Brown, Flick & Peckham

[57] ABSTRACT

A trolley rail is formed from a plurality of aligned tubular housings, each of which has a front side provided with laterally spaced slots extending lengthwise of the rail, and a partition wall extending across the inside of the housing and closing the inner sides of the slots, the side walls of which are provided with grooves receiving electrical conductor bars. The partition wall and the back of the housing have pairs of aligned openings therethrough, with each pair of openings connecting with a different one of the slots. Disposed in the partition wall openings and straddling the adjoining conductor bars are U-shape metal clips with inturned free front edges in front of the bars. The clips are provided with springs or screws pressing conductor bars therein against the inturned edges of the clips. The bars may either overlap in the clips or be disposed end-to-end to form a splice, or each clip may contain a single bar and a metal conductor strip pressed against the bar and extending out of the back of the rail to form an electrical tap to the bar.

8 Claims, 8 Drawing Figures

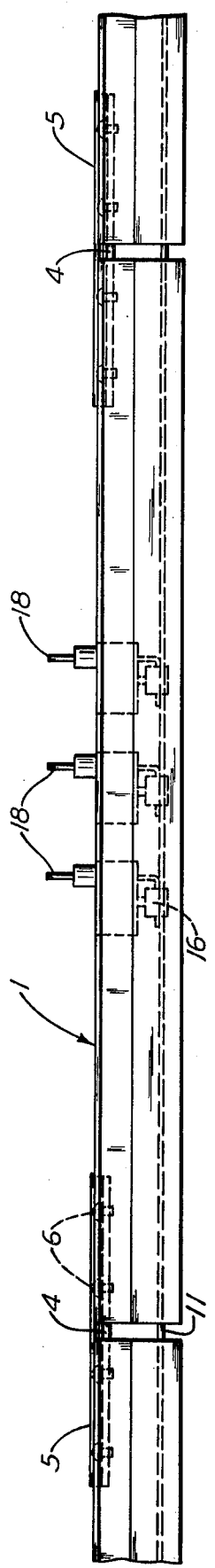
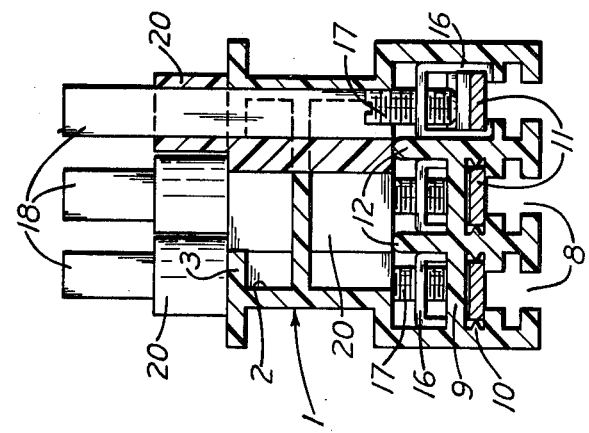
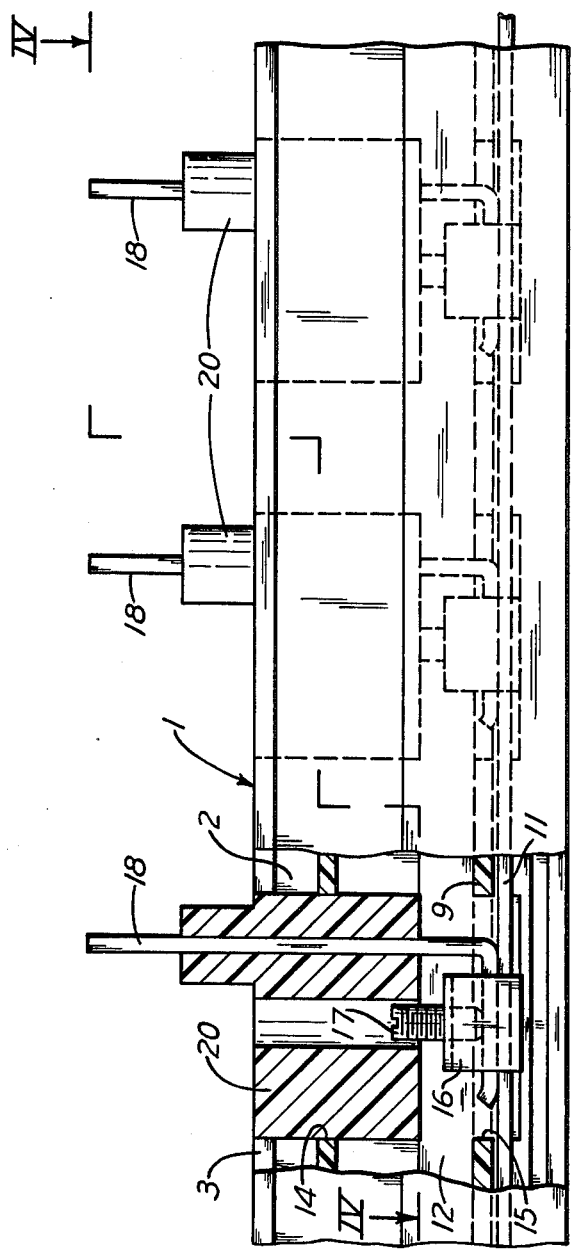

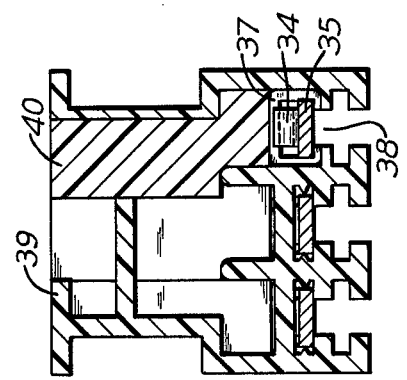
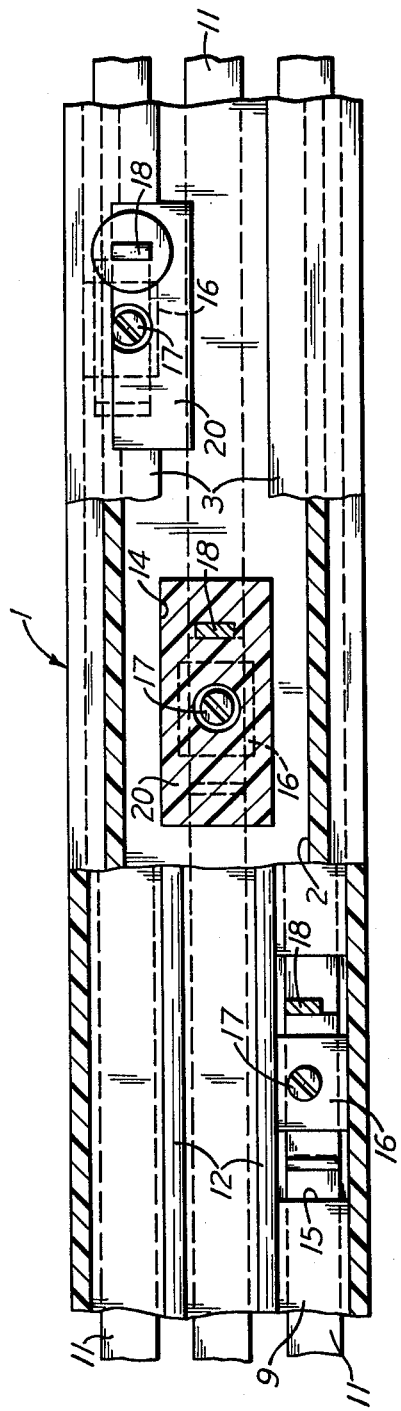
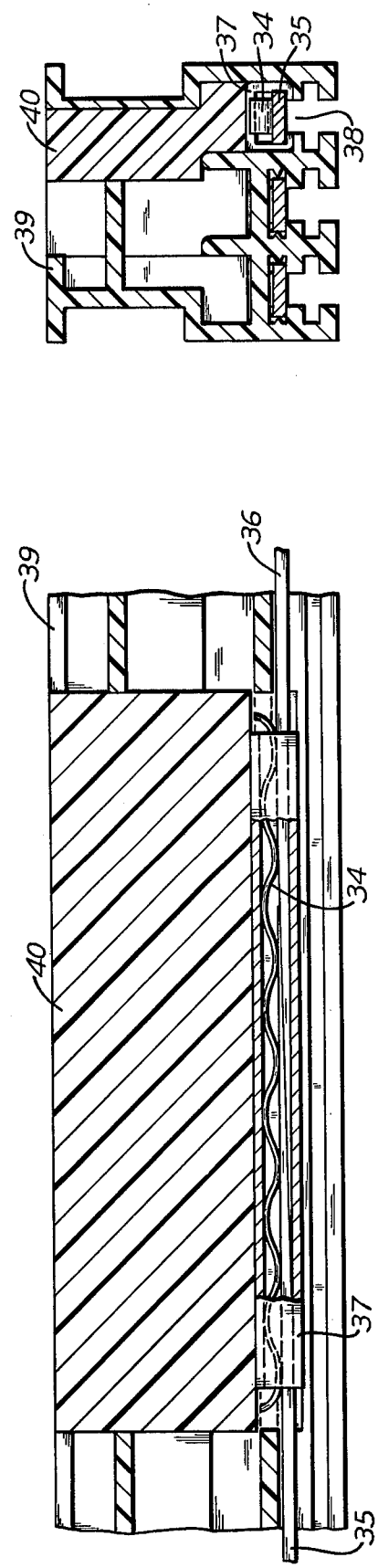

TROLLEY RAIL

In earlier patents, such as in my U.S. Pat. No. 3,772,482, a tubular rail of the type with which this application is concerned is disclosed. The rail is made from a number of housings connected end-to-end. The conductor bars that are mounted in such a rail are connected at their ends to a source of electrical power. There is no way to connect electric terminals to the conductors away from their ends without breaking them or tapping into them. Generally, each housing is about 20 feet long and there is no way to connect two conductor bars end-to-end between the ends of a housing without tapping into the conductors. Splicing of conductors may be required when the length of an installed rail is to be increased or the rail is too long for a continuous conductor bar.

It is among the objects of this invention to provide such a trolley rail, in which electric current can readily be delivered to the conductor bars at any desired point, and in which conductor bars can be spliced together easily wherever desired.

The invention is illustrated in the accompanying drawings, in which

FIG. 1 is a side view of a length of trolley rail including a section provided with taps to the conductor bars;

FIG. 2 is an enlarged fragmentary side view, partly in section, of the central part of FIG. 1;

FIG. 3 is a cross section through the rail and one of the taps;

FIG. 4 is a plan view and horizontal section taken on the line IV—IV of FIG. 2;

FIG. 7 is a fragmentary vertical longitudinal section through a further embodiment of the invention; and FIG. 8 is a cross section through the rail of FIG. 7.

Figure 5:
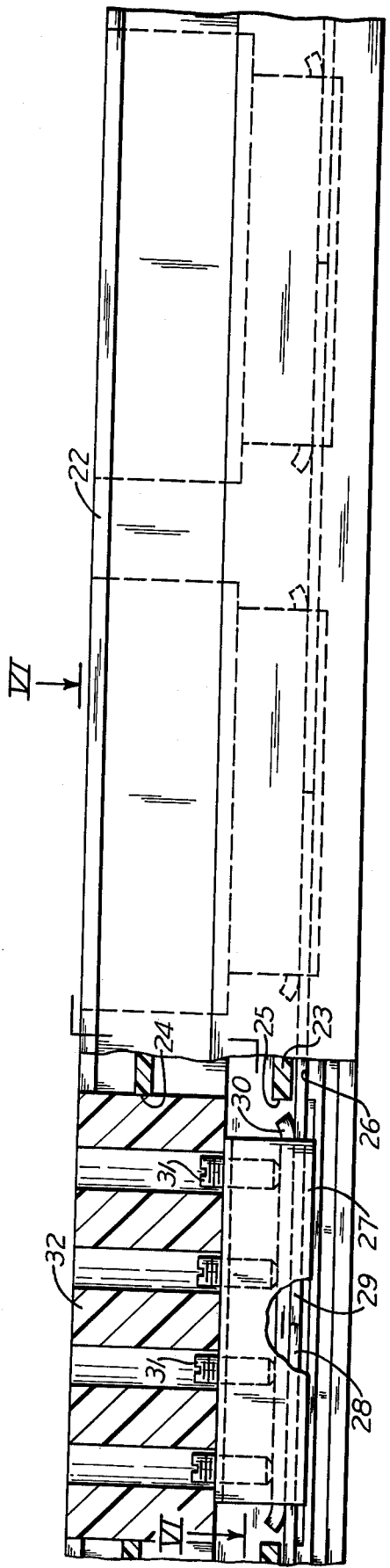
FIG. 5 is a view, similar to FIG. 2, of a modification.

Referring to FIGS. 1 to 4 of the drawings, a rigid housing 1 of any desired length is extruded from a suitable plastic. High impact polyvinyl chloride is satisfactory. The housing has a generally rectangular outline in cross section and is tubular to reduce its weight and to provide a duct for wires and liquid conduits and for other purposes if desired. This housing is connected end-to-end with other like housings to form a trolley rail of any desired length.

In order to fasten each rail housing to a support beside it or above it, the back or top of the housing may be provided with a channel 2 extending lengthwise of it. The outer edges of the walls of the channel have flanges 3 extending toward each other a short distance. Suspension members (not shown) disposed in the channel beneath the flanges will connect the housing to its support or supports. The channels also aid in connecting the housings end-to-end. For this purpose, as shown in FIG. 1, a rectangular plate 4 is slid part way into one end of housing channel and then the adjacent end of the next housing is moved up against or close to the first housing, with the plate straddling the joint between the housings. Another plate 5 is placed against the back of the flanges of both housings, and screws 6 that are rotatably mounted in this plate are screwed into threaded holes in the first plate. By tightening the screws the flanges of the two housings can be clamped between the plates.

The opposite side of each rail housing, which is the bottom or front side, depending on how the rail is mounted, is provided with parallel slots 8 extending lengthwise of it. There are at least two of these slots and usually three or more as shown in FIG. 3. The inner sides of the slots opposite their open sides are closed by a partition wall 9 that extends across them and forms the floor or lower wall of the tubular portion of the housing as shown in FIG. 3. The inner sides of the side walls of each slot are provided beside the partition wall with a pair of opposed grooves 10 extending lengthwise of the housing. Disposed in each of the slots there is a rigid metal conductor bar 11, the edges of which extend into the grooves to retain the bar in place. The bars are inserted in the grooves from one end of the housing. The back of the partition wall may be provided with rearwardly projecting longitudinal ribs 12 that strengthen the wall.

The conductor bars are engaged by current pickup members (not shown) that extend into the slots and are movable along them. These may be trolley wheels or sliding shoes supported at their outer ends in any suitable manner. The contact shoes are electrically connected to conductors, by which current is carried away from them. The conductor bars of one housing may be connected with the bars in the next rail housing in any suitable manner, such as shown in my earlier patent, but preferably in one of the ways described later herein, or they may extend continuously from one end of the rail to the other end. Suitable connections are made at the ends of the rail to the conductors for delivering electric current to them.

It is a feature of this invention that electrical taps can be made to the conductor bars at any desired points along the rail without altering the bars in any way. Accordingly, the rail housing that is supplied for this purpose usually will be much shorter than the rest of the housings forming the complete rail and will be inserted in the rail wherever taps are to be made. All of the housings have the same construction, except that the short housing is provided with certain openings. Thus, the back side or top of the housing and the partition wall 9 inside are provided with a pair of aligned openings 14 and 15, respectively, communicating with each slot 8. These openings extend lengthwise of the housing for a short distance. Disposed in each partition wall opening 15 is a U-shape metal clip 16 that straddles the adjoining metal conducting bar 11. This clip has inturned free front or lower edges located beneath the bar. The back of the clip is provided with a threaded opening, in which there is a set screw 17 that is accessible through the opening 14 in the rear wall of the rail housing. A metal conductor strip 18 extends through the two aligned openings and has an inner end portion bent to extend lengthwise of the rail between the set screw and the bar below it. By turning the screw, this inner end portion of the strip can be pressed tightly against the bar, which in turn will be pressed against the inturned edges of the clip so that all three will be clamped together. The strip conductor extends upwardly from the rail for connection to an electrical conductor.

To close the aligned openings 14 and 15 after the clip and conductor have been put in place, plastic insulating material 20 is poured into the openings and allowed to harden. However, this material does not cover the set screws. Also, the conductor strip 18 can slide in the plastic material when the set screw presses the strip against the bar. The three taps for the three conductor bars thus formed are spaced lengthwise from one another along the rail so that they will not interfere with one another. By placing this particular section of the rail at any desired point in the complete rail, current can be supplied to the conductor bars wherever desired.

Figure 6:
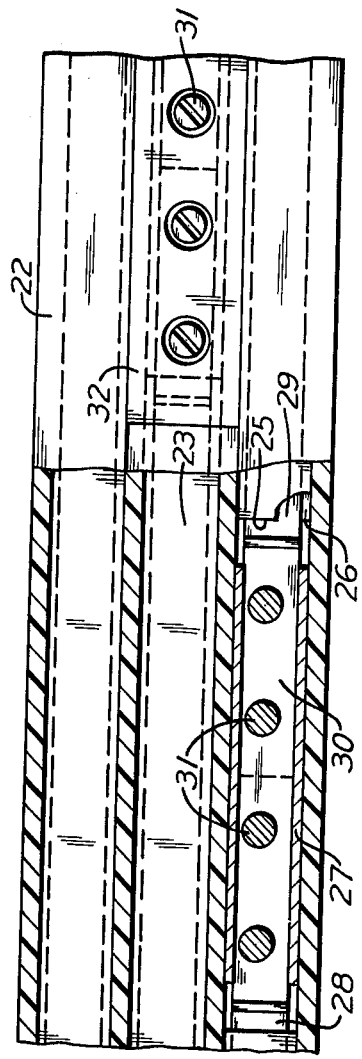
FIG. 6 is a plan view and horizontal section taken on the line VI—VI of FIG. 5.

Another feature of this invention is that a short housing similar to housing 1 can be modified so that when inserted between long housings at any desired point, conductor bars can be spliced or joined together in the short housing, either end-to-end or in overlapping relation. For an end-to-end splice, as shown in FIGS. 5 and 6, the top wall of a short housing 22 and its partition wall 23 are provided with a pair of aligned openings 24 and 25 communicating with each bar-receiving slot 26. These are relatively long openings, and a long U-shaped channel or clip 27 is disposed in each partition opening and straddles two conductor bars 28 and 29 disposed end-to-end inside the clip. The clip has inturned free lower edges engaging the bottom of the bars. Between the two bars and the back of the clip there is a metal strip 30, preferably copper, that is pressed tightly against the bars by means of set screws 31 threaded in the back of the clip and accessible from the back of the housing. The openings in the back of the housing are filled with a hardened plastic 32, except directly above each screw. The copper strip 30 electrically connects the two bars and the set screws clamp the ends of the bars in place. By tapering the bars in thickness toward their ends and overlapping them, strip 30 can be used to press one bar down against the other instead of holding them end to end as shown.

Another way of making the conductor bar splice is to eliminate the set screws and substitute a leaf spring for them as shown in FIGS. 6 and 7. The spring 34 has an undulating or corrugated form and is compressed between the conductor bars 35 and 36 and the back of the long clip 37 that straddles them in a housing slot 38. The bars are simply pushed endwise into the opposite ends of the clip between its inturned lower edges and the spring. If it is desired to have the adjoining ends of the bars overlap, as shown, their end portions are tapered in thickness towards their ends so that there will not be a step at the joint. The openings in housing 39, through which the clips and springs are inserted, are filled with a plastic 40.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. A trolley rail comprising a tubular housing formed of insulating material and having a front side provided with parallel laterally spaced walls forming therebetween parallel slots extending lengthwise of the housing for receiving current pick-up members movable lengthwise of the rail, a partition wall extending across the inside of the tubular housing and closing the inner sides of the slots, the opposite side walls of each slot being provided beside said partition wall with a pair of opposed grooves extending lengthwise thereof, electrical conductor bars in said slots with the edges of the bars retained in the pairs of grooves therein, said partition wall and the back side of the housing having pairs of aligned openings therethrough, each pair of openings communicating with a different one of the slots, U-shape metal clips disposed in said partition wall openings and straddling the adjoining conductor bars, the clips having inturned free front edges in front of said bars, and means in the clips pressing conductor bars therein against said inturned edges of the clips.

2. A trolley rail according to claim 1, in which said pressing means comprise set screws threaded in the backs of said clips and accessible through said openings in the back side of the housing for turning.

3. A trolley rail according to claim 2, including metal conductor strips extending through said aligned openings and having inner end portions disposed between said set screws and bars, and means for connecting electrical conductors to the outer ends of said strips behind the back of said housing, said screws pressing said strips tightly against the bars in front of them.

4. A trolley rail according to claim 1, in which said pressing means consist of springs compressed between the backs of said clips and the conductor bars therein.

5. A trolley rail according to claim 1, in which there are two conductor bars disposed end-to-end in each clip.

6. A trolley rail according to claim 5, in which said pressing means consist of set screws threaded in the back of each clip and pressing against both bars in front of them.

7. A trolley rail according to claim 1, in which there are overlapping end portions of two conductor bars in each clip.

8. A trolley rail according to claim 7, in which said pressing means comprise a spring in each clip compressed between the back of the clip and the adjoining conductor bar end portion.

* * * * *